(12) United States Patent
Yamamoto et al.

(10) Patent No.: US 6,322,279 B1
(45) Date of Patent: Nov. 27, 2001

(54) ADJUSTABLE ATTACHMENT DEVICE

(75) Inventors: Mayjue A. Yamamoto, Corona; Louis Haug, Phelan, both of CA (US)

(73) Assignee: Sports Carriers, Inc., Corona, CA (US)

(*) Notice: Subject to any disclaimer, the term of this patent is extended or adjusted under 35 U.S.C. 154(b) by 0 days.

(21) Appl. No.: 09/185,296

(22) Filed: Nov. 3, 1998

(Under 37 CFR 1.47)

Related U.S. Application Data (60) Provisional application No. 60/064,247, filed on Nov. 4, 1997.

(51) Int. Cl.[7] ................................. F16D 1/12; B60R 9/00
(52) U.S. Cl. ........................ 403/97; 403/93; 224/324; 24/68 CD
(58) Field of Search ................................ 403/97, 93, 96, 403/101, 105, 359.1, 359.3, 359.4; 24/68 CD, 265 CD, 115 G, 136 L; 254/224, 242, 324; 410/100, 103, 77, 80, 104; 224/324, 323, 917.5

(56) References Cited

U.S. PATENT DOCUMENTS

| | | |
|---|---|---|
| 379,967 | 3/1888 | Mains . |
| 679,224 | 7/1901 | Fox . |
| 1,235,217 | 7/1917 | McFee . |
| 1,657,190 | 1/1928 | Ballou . |
| 1,849,532 | 3/1932 | McDevitt . |
| 1,874,731 | 8/1932 | Younce . |
| 1,978,646 | 10/1934 | Oishei et al. . |
| 2,383,199 | 8/1945 | Kitts . |
| 2,408,347 | 9/1946 | Sprouse . |
| 2,451,702 | 10/1948 | Weigand . |
| 2,604,098 | 7/1952 | Kranc . |
| 2,626,530 | 1/1953 | Miller . |
| 2,641,817 | 6/1953 | Brodheim . |
| 3,261,062 | 7/1966 | Scarborough, Jr. . |
| 3,430,303 | 3/1969 | Perrin et al. . |
| 3,808,643 | 5/1974 | Gouge . |
| 3,826,473 | 7/1974 | Huber . |
| 3,848,889 | * 11/1974 | Sharrow ................................ 410/103 |
| 4,186,905 | * 2/1980 | Brudy .................................. 403/97 X |
| 4,234,166 | * 11/1980 | Cederblad ......................... 24/68 CD |
| 4,369,009 | 1/1983 | Fulford . |
| 4,388,748 | 6/1983 | Riedel . |
| 4,475,854 | 10/1984 | Ericcson . |
| 4,819,307 | 4/1989 | Turner . |
| 4,823,443 | 4/1989 | Waters . |
| 4,900,203 | * 2/1990 | Pope ................................... 24/68 CD |

(List continued on next page.)

Primary Examiner—Harry C. Kim
(74) Attorney, Agent, or Firm—Lyon & Lyon LLP (57) ABSTRACT

An adjustable attachment device for mounting an accessory, such as a bicycle, ski, or cargo rack, to a frame, such as an automobile roof rack. The device includes an elongate pin rotatably mounted across an aperture in a housing to which one end of a strap is attached, the pin having a shaft about which the strap is wound. A collar having a ratcheted perimeter is coupled to the pin. A capsule, having a cavity therein for receiving the collar, is attached to the housing, the capsule including teeth therein for engaging the ratcheted perimeter of the collar. A tool may be directed through an opening in the capsule into the cavity to direct the collar axially for disengaging the ratcheted perimeter from the teeth and to rotate the collar and pin. The housing is placed on a frame member, a lower surface thereof having recesses shaped similar to the frame member, the strap is wrapped around the frame member, the end of the strap is received in an anchoring slot in the housing, and the excess strap is wound around the pin to tighten the strap around the frame member. Alternatively, a worm and worm gear winding mechanism, or a cooperating ratchet wheel and pawl may be provided on the housing for controlling pin rotation.

32 Claims, 6 Drawing Sheets

U.S. PATENT DOCUMENTS

| | | |
|---|---|---|
| 4,913,608 | 4/1990 | Royball . |
| 5,156,506 | 10/1992 | Bailey . |
| 5,168,601 * | 12/1992 | Liu ...................................... 403/93 X |
| 5,257,439 | 11/1993 | LeBlanc . |
| 5,263,230 | 11/1993 | Johnson . |
| 5,338,136 | 8/1994 | Hetchler . |
| 5,490,621 * | 2/1996 | Dixon et al. ..................... 224/323 X |
| 5,494,387 | 2/1996 | Ruegg . |
| 5,661,876 | 9/1997 | Goldenberg . |
| 5,671,506 | 9/1997 | Eliasson . |
| 5,692,269 | 12/1997 | Kamper . |
| 5,729,873 | 3/1998 | Miley . |
| 5,853,164 * | 12/1998 | Hunt ................................. 410/103 X |

\* cited by examiner

ADJUSTABLE ATTACHMENT DEVICE

This application claims the benefit of U.S. Provisional Application Ser. No. 60/064,247, filed on Nov. 4, 1997, the disclosure of which is expressly incorporated herein.

FIELD OF THE INVENTION

The present invention relates generally to devices for attaching accessories to frame structures, and more particularly to devices for attaching accessories, such as a bicycle, ski or cargo rack, to the frame of a roof rack on an automobile.

BACKGROUND

It is often desirable to attach an accessory, such as a bicycle, ski or cargo carrier or rack, to a roof rack of an automobile. Generally, roof racks include two or more cross bars to which such accessories may be attached, and may have a number of different cross-sectional shapes. For example, the cross bars may have a round, square, rectangular or oval shape, depending upon the design and/or manufacturer of the roof rack.

The carrier or rack being attached to the roof rack often includes a support frame or support members which must be securely attached to the cross bars. To provide this attachment, brackets or wraparound straps may be used. Because of the variety of cross bar configurations that may be encountered, however, custom brackets may be required to securely attach to each particularly shaped cross bar. Straps alone may accommodate a variety of cross bar shapes, but may not secure the accessory to the cross bar as effectively as desired.

Accordingly, there is a need for a universal attachment device that may facilitate attachment between an accessory and a variety of differently configured frame members, such as the cross bars on an automobile roof rack.

SUMMARY OF THE INVENTION

The present invention is directed to an adjustable attachment device which may be used to mount an accessory, such as a bicycle rack, a ski carrier, or a cargo rack, to a frame member, such as a roof rack of an automobile. In accordance with one aspect of the present invention, an adjustable attachment device is provided that includes a housing having an aperture therein. An elongate pin is rotatably mounted across the aperture to which a first end of a flexible strap may be attached. The pin has a shaft terminating in a head, and defines an axis of rotation for winding and unwinding the flexible strap around the shaft within the aperture.

A collar is rotatably mounted to the housing coextensive with the axis of rotation defined by the pin. The collar has a head engaging portion for engaging the head of the pin to couple pin and collar rotation, and has a ratcheted perimeter. A locking mechanism is provided having one or more teeth for engaging the ratcheted perimeter of the collar to prevent collar rotation. Either the collar or the locking mechanism is adjustable between first and second positions for engaging and disengaging the ratcheted perimeter and the teeth, respectively.

In a preferred form, the locking mechanism is a capsule attachable to the housing having a cavity therein for receiving the collar, and including an internal perimeter having the teeth therein. The collar is preferably rotatable within the cavity and axially translatable between the first and second positions within the cavity, and a spring is preferably provided within the cavity of the capsule for biasing the collar towards the first position.

The capsule may include an opening communicating with the cavity for receiving a tool therethrough for directing the collar from the first position to the second position. The collar also may include a tool engaging portion aligned with the opening for engaging the tool received through the opening for rotating the collar with the tool. Thus, the collar may be directed to the second position to allow rotation of the collar, and consequently, the pin, but may automatically return to the first position to substantially secure the pin to prevent inadvertent unwinding.

The pin may include an elongate slot extending along the shaft, the elongate slot having a fixed length formed in the shaft or the elongate slot may extend the entire length of the shaft, similar to a cotter pin. The first end of a flexible strap may be attached to the pin through the elongate slot, and the housing preferably includes an anchoring slot for receiving a second end of the flexible strap.

The housing may include a lower surface proximate the aperture having one or more recesses therein for engaging a frame member having a shape at least partially defined by the recesses. The recesses may define a portion of an ellipse, a circle or a rectangle, i.e., may have shape similar to at least a portion of the frame member to which the attachment member is attached. The flexible strap preferably has a sufficient length for allowing the flexible strap to be wrapped around the frame member engaging the recesses in the housing and the second end to be subsequently received in an anchoring slot in the housing. A support flange may extend from the housing for engaging an accessory being attached to the frame member.

In accordance with another aspect of the present invention, an adjustable attachment device is provided that includes a housing having an aperture therein, and a lower surface proximate the aperture having one or more recesses therein for engaging a frame member having a shape at least partially defined by the recesses. A support flange extends from the housing for engaging an accessory being attached to the frame member. An elongate pin is rotatably mounted across the aperture to which a first end of a flexible strap may be attached. The pin has a shaft terminating in a head, and defines an axis of rotation for winding and unwinding the flexible strap around the shaft within the aperture. A winding mechanism is attached to the housing and coupled to the head of the pin, the winding mechanism having a shaped portion for engaging a working end of a tool for rotating the pin to wind and unwind the flexible strap around the shaft.

In one form, the head of the pin includes a worm gear, and the winding mechanism is a worm engaging the worm gear and rotatably mounted to the housing. In another form, the winding mechanism is a cooperating ratchet wheel and pawl, the ratchet wheel being attached to the head of the pin and the pawl being attached to the housing.

The housing may include an anchoring slot for receiving a second end of a flexible strap attached to the pin, preferably having a shape corresponding to a cross pin attached to the second end of the strap. The flexible strap preferably has a sufficient length for allowing the flexible strap to be wrapped around the frame member engaging the recesses in the housing and the second end to be received in the anchoring slot.

Thus, the housing may be seated on a variety of frame members, having round, oval or rectangular shapes, such as a roof rack on an automobile. The strap may be wrapped around the frame member, and the second end of the strap received in the anchoring slot. The winding mechanism may be used to wind the excess strap around the shaft of the pin until the strap is substantially tightened around the frame member. An accessory, such as a bicycle rack, a ski rack, a cargo rack or a cargo container, may then be attached to the flange extending from the housing, thereby substantially securely mounting the accessory to the frame member using a single standard attachment device.

Other objects and features of the present invention will become apparent from consideration of the following description taken in conjunction with the accompanying drawings.

DETAILED DESCRIPTION OF THE PREFERRED EMBODIMENTS

Figures 1, 2A, 2B:
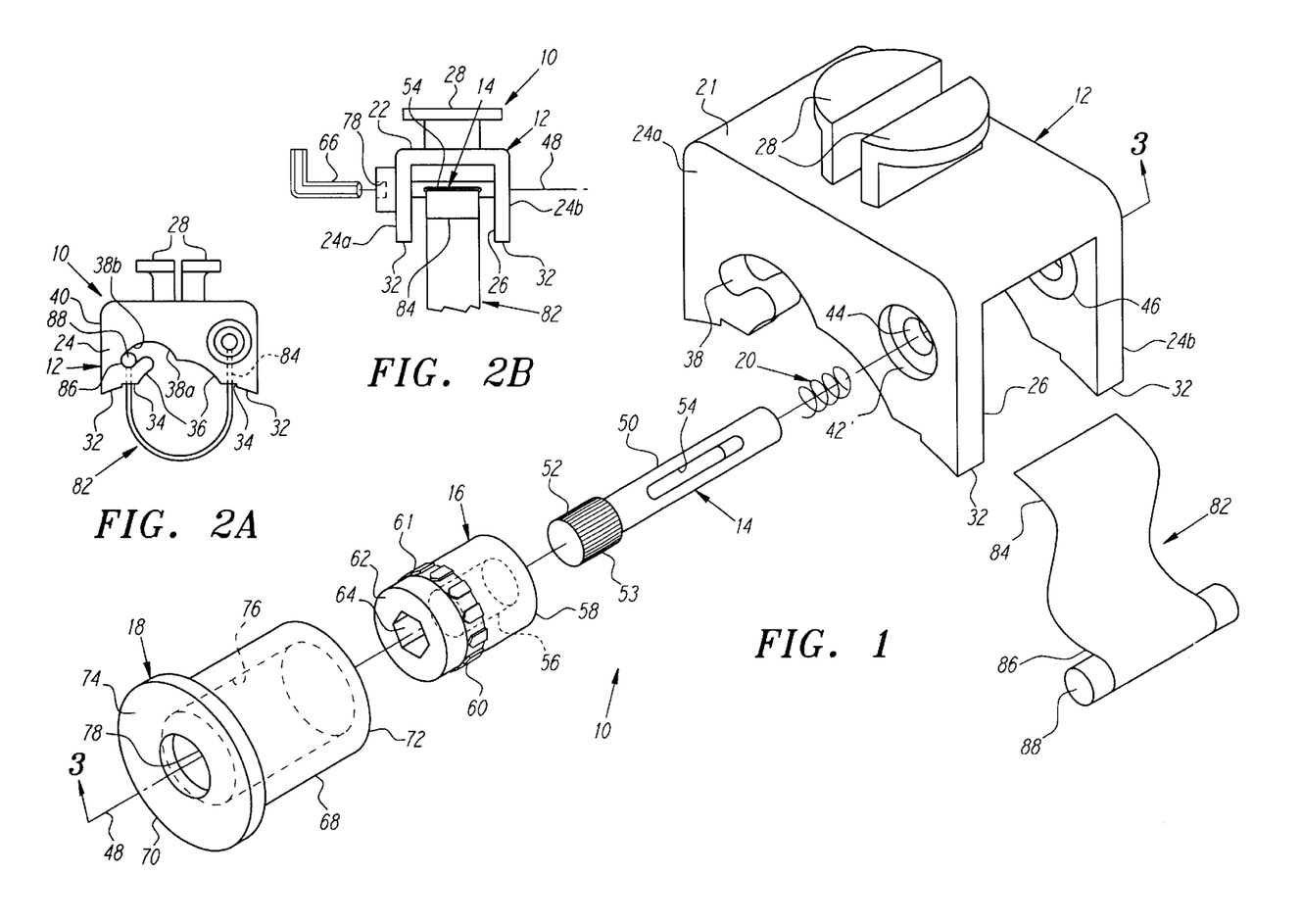
FIG. 1 is an exploded perspective view of a first preferred embodiment of an adjustable attachment device in accordance with the present invention.
FIGS. 2A and 2B are side and end views, respectively, of the assembled adjustable attachment device of FIG. 1.

Turning now to the drawings, FIGS. 1–6 show a first preferred embodiment of an adjustable attachment device 10 in accordance with the present invention. As shown in FIG. 1, the device 10 generally includes a housing 12, a pin 14, a collar 16, a capsule 18, and a spring 20. The housing 12, collar 16 and capsule 18 are preferably formed from molded plastic or other substantially rigid, durable material. The pin 14 is preferably formed from aluminum, although other substantially rigid metal or plastic materials may also be used.

As best seen in FIGS. 2A and 2B, the housing 12 preferably has an upper portion 22, and a pair of side portions 24, generally defining a "U" shape and defining an aperture 26. A pair of opposing flanges 28 extend from the upper portion 22 for engaging an accessory, such as the frame of a bicycle rack, a ski rack or a cargo rack (not shown). The side portions 24 each include a lower surface 32 extending along the aperture 26 having a plurality of recesses 34, 36 therein for engaging a frame member (not shown), for example, of a roof rack for an automobile, having a shape at least partially defined by the recesses 34, 36. For example, the lower surface 32 may have a shape defining a portion of an ellipse or oval (see FIG. 7C), and may include a first pair of recesses 34 defining a portion of a rectangle (see FIG. 7B), and a second pair of recesses 36 defining a portion of a circle (see FIG. 7A), thereby facilitating the substantially secure attachment of the device 10 to a number of different shaped frame members.

Turning to FIGS. 1 and 2A, the side portions 24 also each include a slot 38 for receiving and substantially anchoring a free end of a flexible strap (not shown). Preferably, each slot 38 extends from the lower surface 32 of the respective side portion 24, and includes an entry region 38a into which the free end of the strap may be easily introduced and a seating region 38b for substantially retaining the free end when the strap is wrapped around a frame member. Alternatively, the slots may extend from other locations on the side portions 24, for example, from an end surface 40 of the side portions 24 (not shown).

Figure 6:
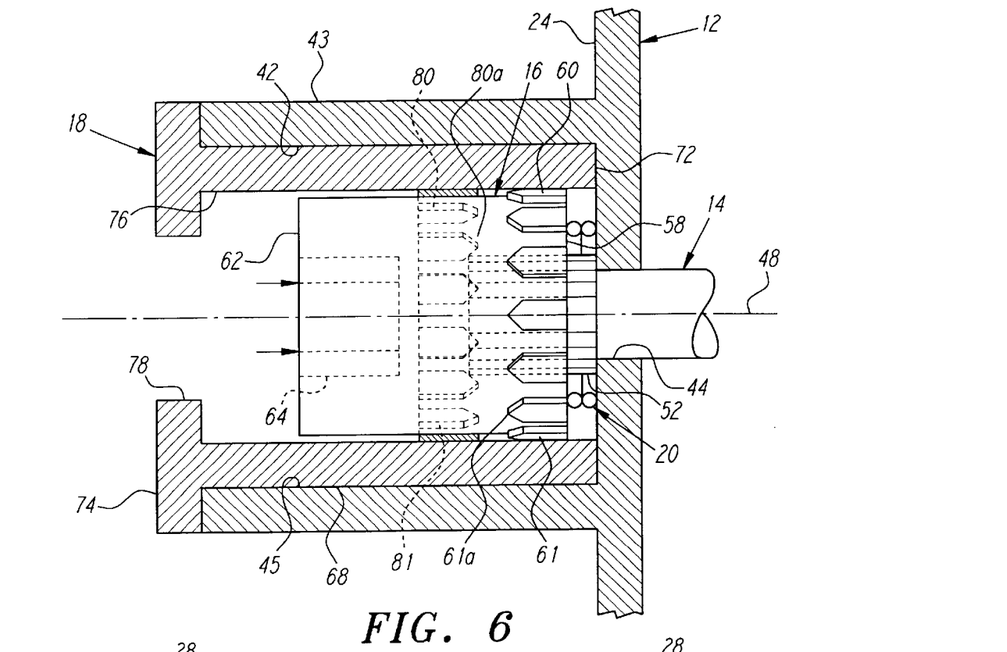
FIG. 6 is a cross-sectional detail of the assembled adjustable device of FIG. 3.

Turning to FIGS. 1 and 6, one of the side portions 24a includes a recessed or raised area 42 to which the capsule 18 may be attached, and through which a first hole 44 extends through the side portion 24a. In a preferred form, shown in FIG. 6, a raised area 42 is provided that includes an annular wall 43 defining a cavity 45, while alternatively, as shown in FIG. 1, a recessed area 42' may be provided. A recess 46 or second hole (not shown) are provided in the opposing side portion 24b opposite the first hole 44, thereby defining an axis 48 that extends substantially transversely across the aperture 26.

Figure 3:
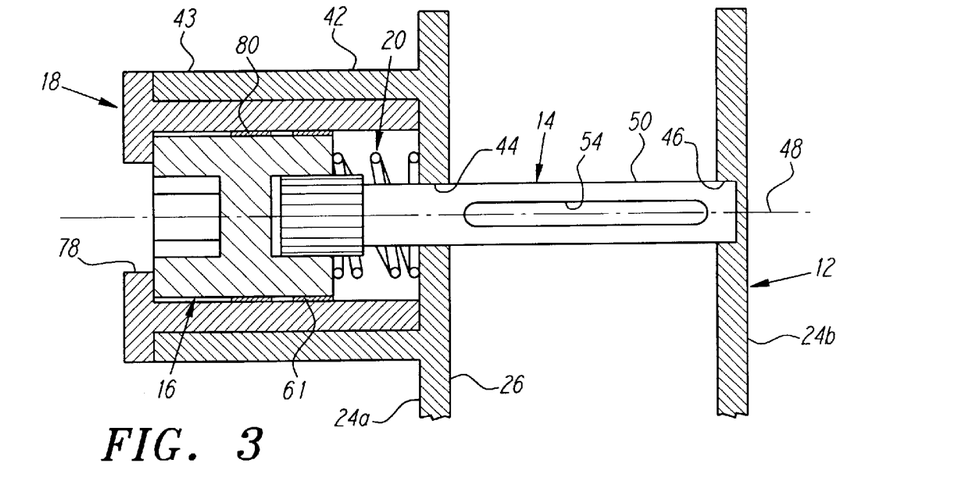
FIG. 3 is a cross-sectional view of the assembled adjustable attachment device of FIG. 1, taken along line 3—3.
Figure 5:
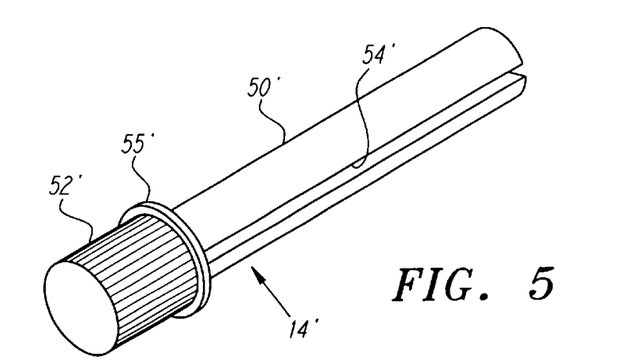
FIG. 5 is a perspective view of an alternative embodiment of an elongate pin for use with the adjustable attachment device of FIG. 1.

With reference to FIGS. 1 and 3, the pin 14 is a generally cylindrical shaft 50 terminating in a head 52, and including an elongate slot 54 extending along the shaft 50. The slot 54 may be formed through the shaft 50 and may have a predetermined length corresponding substantially to the width of a strap (not shown) to be attached thereto. Alternatively, as shown in FIG. 5, a pin 14' may be formed with a slot 54' extending the entire length of the shaft 50', similar to a cotter pin, with a head 52' and a bearing collar 55, formed directly on one end. The head 52 preferably has a generally cylindrical shape, including a plurality of grooves or splines 53 extending axially along the head 52. Alternatively, the head may have a predetermined shape, for example, a hexagonal shape (not shown), or a ratcheted perimeter, including a predetermined number of teeth, such as sixteen teeth.

Returning to FIG. 1, the collar 16 is a generally cylindrical body having a first end 58 and a second end 62, and including a ratcheted perimeter region 60 defined by a plurality of raised teeth 61. The first end 58 of the collar 16 defines a head engaging portion for engaging the head 52 of the pin 14 to couple rotation of the pin 14 to the rotation of the collar 16. In a preferred form, the head engaging portion is a recess 56 in the first end 58 of the collar 16 having a shape similar to the head 52 of the pin 14, for example, including a plurality of grooves or splines (not shown) for engaging the grooves 53 on the head 52. The second end 62 of the collar 16 preferably includes a tool engaging portion for engaging the working end of a tool (not shown). In a preferred form, the tool engaging portion is a hexagonal shaped recess 64 for receiving an Allen tool 66 (shown in FIG. 2B). Alternatively, a shaped recess (not shown) corresponding to other tools, such as a Phillips-head or slotted-head screwdriver, may be provided.

The spring 20 may be any of a variety of conventional biasing members that are resiliently deflectable, preferably a helical wire spring. The spring 20 has a diameter large enough to pass over the head 52 of the pin 14, but small enough to substantially engage the first end 58 of the collar 16 and be compressed between the first end 58 of the collar 16 and the side portion 24a of the housing 12.

With reference to FIGS. 1 and 6, the capsule 18 is a hollow, generally cylindrical body 68 defining a cavity 76 therein, and having an open first end 72 and a substantially enclosed second end 70. The second end 70 has an opening 74 therethrough communicating with the cavity 76, the opening 74 having a size at least as large as the hexagonal recess 64 in the collar 16. The capsule 18 includes a plurality of teeth 80 formed in the wall of the capsule 18 and distributed about an interior perimeter region 81 within the cavity 76.

As shown in FIGS. 1, 3 and 6, the pin 14, collar 16, spring 20, and capsule 18 are concentrically arranged along the axis 48, which defines an axis of rotation for the pin 14 and collar 16. The pin 14 is rotatably mounted to the housing 12 across the aperture 26, preferably by inserting the shaft 52 into the first hole 44 and across the aperture 26 until the end of the shaft 52 enters the recess 46 and the head 52 enters the cavity 45 defined by the annular wall 43. With the pin 14 fully received in the housing 12, the slot 54 is preferably aligned centrally within the aperture 26.

The spring 20 may then be placed over the head 52, and the inner end 58 of the collar 16 advanced over the head 52, until the head 52 is seated within the recess 56. The first end 72 of the capsule 18 may then be directed over the collar 16 until the first end 72 is fully received in the cavity 45 defined by the annular wall 43 of the housing 12, which may partially compress the spring 20 between the first end 58 of the collar 16 and the side portion 24a defining the bottom of the cavity 45.

The capsule 18 is preferably substantially permanently attached to the housing 12, for example, using an adhesive applied between the annular wall 43 and the capsule body 68 and/or the first end 72 and the bottom of the cavity 45. The capsule 18 may also include one or more tabs (not shown) at predetermined locations extending radially from the first end 72 which may be aligned with corresponding recesses (not shown) in the side portion 24a of the housing 12 to further stabilize and secure the capsule 18 to the housing 12.

As may be seen in FIGS. 3 and 6, when the capsule 18 is attached to the housing 12, the collar 16 is axially translatable within the cavity 76 between a first or outer position, shown in FIG. 3, and a second or inner position, shown in FIG. 6. In the first position, the predetermined locations of the teeth 61 extending from the collar 16 and the teeth 80 in the wall 68 of the capsule 18 are such that the teeth 61, 80 engage one another, thereby preventing rotation of the collar 16 and, consequently, of the pin 14. When the collar 18 is directed axially inward to the second position, the spring 20 is compressed, and the teeth 61 on the collar 16 are disengaged from the teeth 80 in the capsule 18, thereby allowing the collar 16, and consequently the pin 14, to be rotated about the axis 48.

Because of the spring 20, however, the collar 16 is biased towards the first position. For this reason, as shown in FIG. 6, the outer ends 61a of the teeth 61 on the collar 16 and/or the inner ends 80a of the teeth 80 in the capsule are preferably pointed to facilitate the teeth 61, 80 entering into substantial engagement with one another when the collar 16 is released from the second position and allowed to return to the first position.

With particular reference to FIG. 6, the opening 78 in the second end 74 of the capsule 18 allows communication with the cavity 76 and, consequently, with the collar 16. A tool (not shown) may be received through the opening 78 for directing the collar 16 from the first position to the second position. More preferably, when the tool is directed through the opening 78, a working end of the tool enters and substantially engages the hexagonal recess 64 in the collar 16, thereby allowing the collar 16 to be rotated by rotating the tool. Thus, a tool introduced through the opening 78 may be used to disengage the collar 16, and to rotate the collar 16 and pin 14 to wind and/or unwind a strap attached to the pin 14 around the shaft 50.

As shown in FIGS. 2A and 2B, a flexible strap 82 may be provided that includes a first end 82 and a second end 84, the second end 84 including a cross pin 86 having a width greater than the width of the aperture 26 in the housing 12. The strap 82 may be formed from a variety of conventional flexible materials, such as a canvas or woven synthetic material, that provide a desired tensile strength. The first end 84 of a strap 82, having a desired length corresponding to the intended use, may be inserted through the slot 54 in the pin 14, the first end 84 preferably being substantially retained therein by friction between the strap material and the walls of the slot 54. Alternatively, a predetermined length of strap 82 may be provided as a permanent component of the device 10, by substantially permanently securing the first end 84 to the pin 14, for example, by wrapping the first end 84 around the shaft 50 of the pin 14 and stitching the first end 84 to an adjacent region of the strap 82 and/or by using an adhesive. The second free end 86 of the strap 82 may be received in the housing 12 by introducing the ends of the cross pin 88 into the entry region 38a of the opposing anchoring slots 38 and directing the cross pin around to the seating region 38b.

Figures 7A, 7B, 7C:
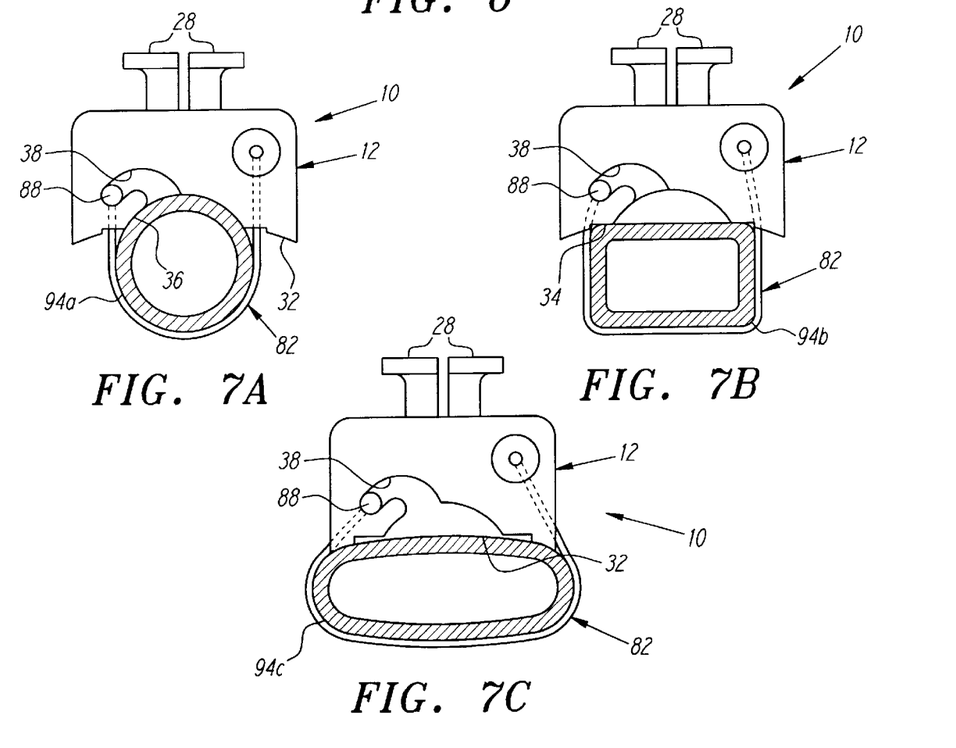
FIGS. 7A–7C are side views of an adjustable attachment device being mounted to circular, rectangular and oval cross-section frame members, respectively.

Turning to FIGS. 7A–7C, and 8, the attachment device 10, with an appropriate length of flexible strap 82 attached to the pin 14, may then be secured to a frame member 94, such as a cross bar 96 on a roof rack 92 of an automobile 90. The lower surfaces 32 of the housing 12 may be placed against the frame member 94, preferably such that the recesses 34, 36 corresponding to the shape of the frame member 94 substantially seat the housing 12 on the frame member 94, as shown in FIGS. 7A–7C. The strap 82 may then be wrapped around the frame member 94, and the cross pin 88 directed into the anchoring slots 38 until received in the seating regions 38b.

Figure 8:
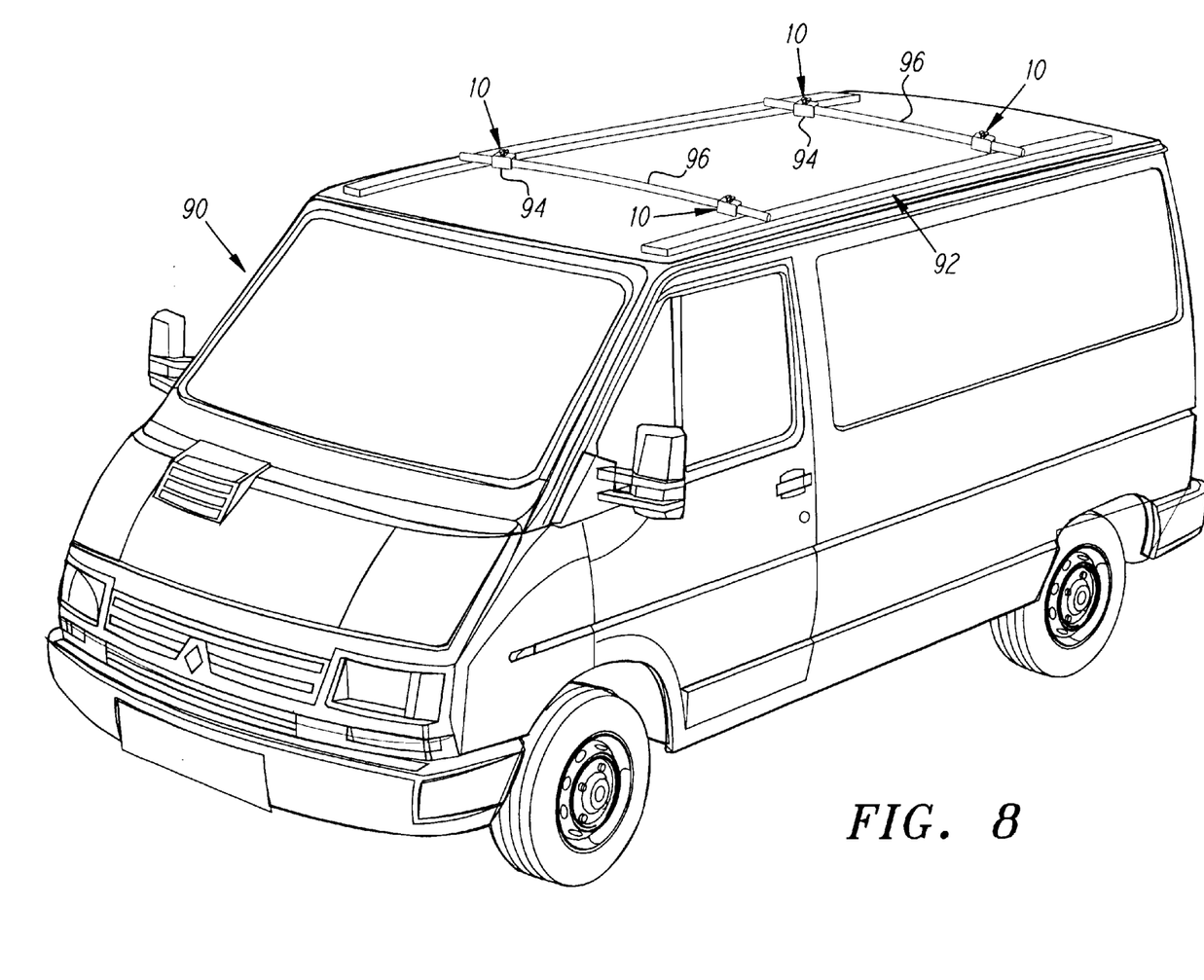
FIG. 8 is a perspective view of an automobile with a roof rack, showing a plurality of attachment devices being attached to cross bar frame members of the roof rack.

With additional reference to FIGS. 2A, 2B and 3, a tool, such as an Allen wrench 66, may then be inserted into the opening 78 until it engages the recess 64 in the collar 16. The tool 66 may be used to direct the collar 16 inwards to its second position, and then to rotate the collar 16, thereby rotating the pin 14 and winding the excess strap 82 around the shaft 50 until the strap is substantially tightened around the frame member 94. As shown in FIG. 8, it may be desirable to attach a plurality of attachment devices 10 frame members 94, such as the cross bars 96 of the roof rack 92.

An accessory, such as a bicycle, ski or cargo rack (not shown), may then be attached to the attachment device(s) 10, thereby securing the accessory to the frame members 94. For example, the accessory may include a frame, leg or other support member having a slot or track (not shown) for receiving the flanges 28 extending from the housing 12. Alternatively, the housing 12 of the attachment device 10 may include other attachment members (not shown) corresponding to a desired accessory. Thus, the accessory may be easily attached to the frame member 94 using a single design of attachment device 10, in accordance with the present invention, which may accommodate a variety of shapes and configurations of frame members 94.

Figure 4:
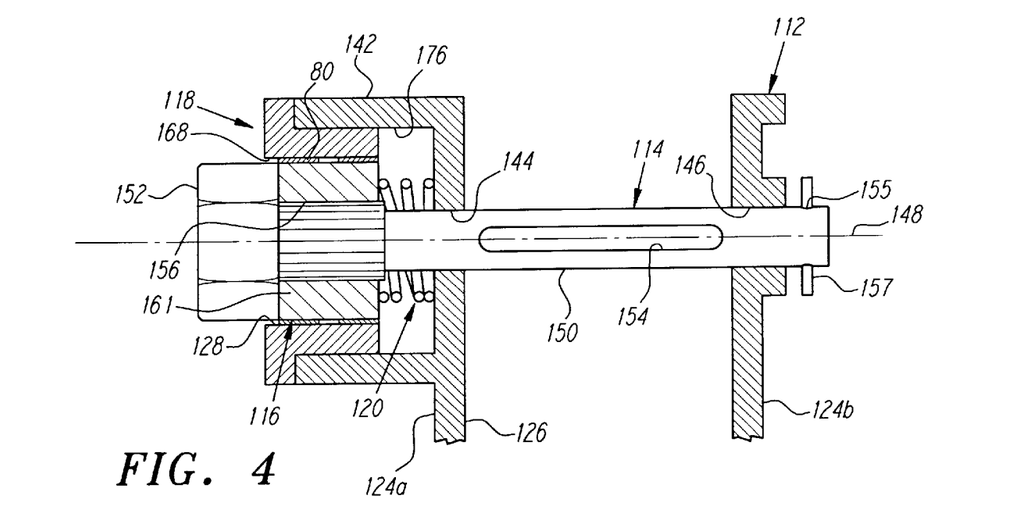
FIG. 4 is a cross-sectional view of an alternative embodiment of the adjustable attachment device of FIG. 1.

Turning to FIG. 4, an alternative embodiment of an adjustable attachment device 110 is shown. Similar to the previous embodiment, the attachment device 110 includes a housing 112 having side portions 24 defining an aperture 126, a raised area 142 defining a cavity 176, and a first hole 144. Instead of a recess opposite the first hole 144, a second hole 146 is provided, thereby defining an axis of rotation 148. A pin 114 is rotatably mounted to the housing 112 such that a slot 154 in a shaft 150 of the pin 114 extends across the aperture 126. The pin 114 includes a slotted end 155 opposite a head 152 into which a "C" clip may be received. Alternatively, the end 155 of the shaft 150 may be threaded for receiving a washer and/or nut (not shown) or other element for securing the end 155 of the shaft 150 to prevent withdrawal of the pin 114, as will be appreciated by those skilled in the art.

A spring 120 and collar 116 may directed onto the shaft 150 prior to insertion across the aperture 126. The collar 116 may have an annular shape defining a passage 156 having a diameter smaller than the size of the head 152 of the pin 114. Preferably, the collar 116 has a plurality of grooves (not shown) in the passage 156 corresponding to similar grooves on an underlying region of the shaft 150, thereby coupling rotation of the pin 114 to rotation of the collar 116. The collar 116 also may have a ratcheted outer perimeter region 160 including a plurality of teeth 161.

A capsule 118 may be attached to the raised area 142 to substantially enclose the cavity 176. The capsule 118 may include a plurality of teeth (not shown) in its wall 168 for engaging the ratcheted perimeter of the collar 118 to prevent collar and pin rotation, or alternatively the teeth may be provided in the annular wall of the raised area 142. The head 150 of the pin 152 preferably extends through an opening 178 in the capsule 118 and beyond the capsule 118, thereby providing an exposed tool engaging portion, e.g., a hexagonal or otherwise shaped head 152. Alternatively, a shaped recess may be provided in the head 152 for receiving a corresponding tool, such as a slotted screwdriver, a Phillips-head screwdriver or an Allen wrench.

A tool, such as a socket wrench, screwdriver or Allen wrench (not shown), may be directed into engagement with the head 152, and the pin 114 directed axially inward to disengage the teeth 161 on the collar 114 from the teeth in the capsule wall 168. The tool may then be used to rotate the pin 114 and wind and unwind a flexible strap (not shown) around the shaft 150. When the tool is withdrawn, the spring 120 biases the pin 114 and collar 116 back to their first position, the teeth 161 on the collar 116 once again engaging the teeth in the capsule wall 168 to prevent further rotation of the pin 114.

Figure 9A:
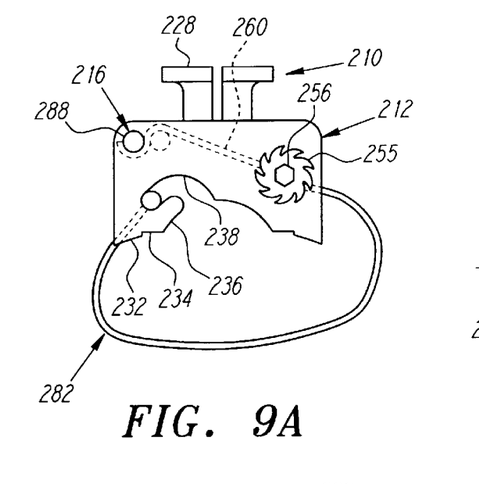
FIGS. 9A and 9B are side and end views, respectively, of another embodiment of an adjustable attachment device.
Figure 9B:
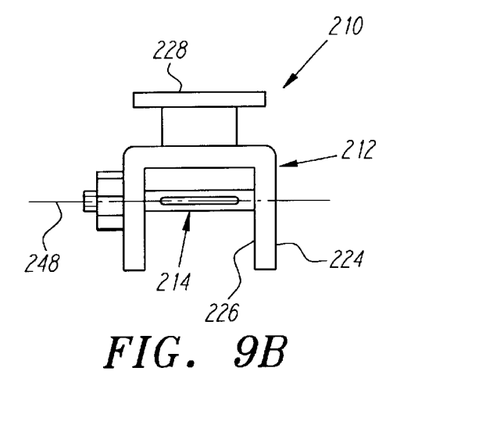
Figures 9C, 9D, 9E, 9F:
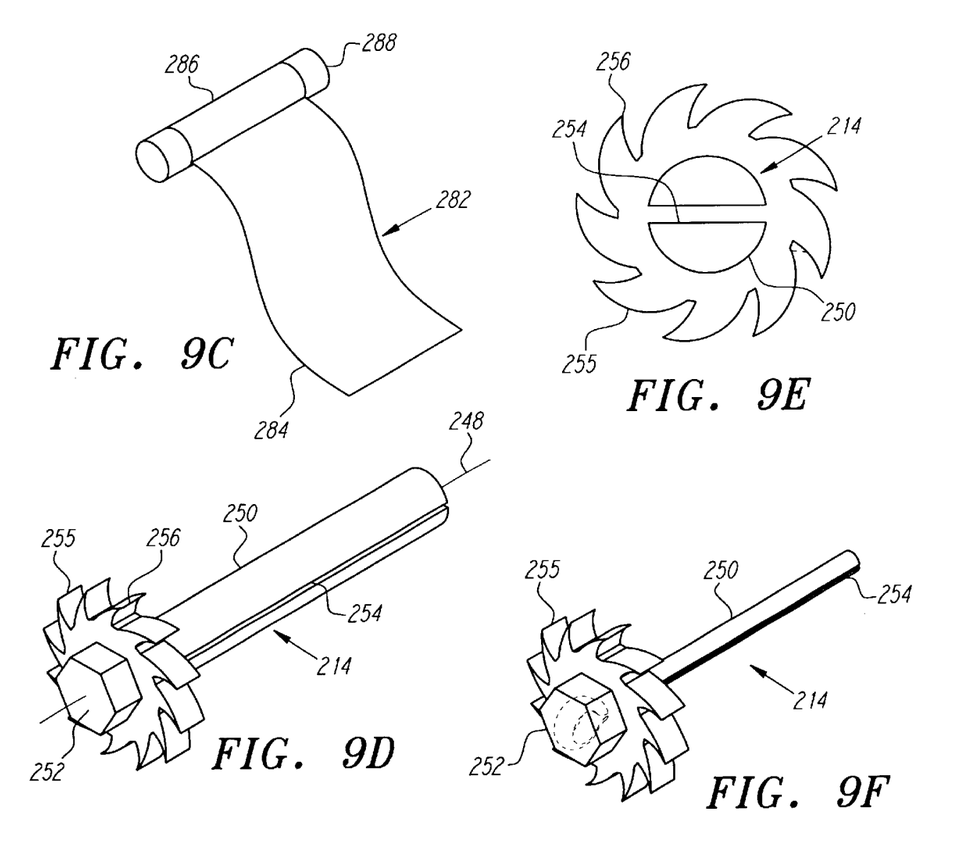
FIG. 9C is a perspective view of a flexible strap for use with the adjustable attachment device of FIGS. 9A and 9B.
FIGS. 9D–9F are perspective, end and cross-sectional views, respectively, of a pin for use with the adjustable attachment device of FIGS. 9A and 9B.

Turning to FIG. 9, another embodiment of an adjustable attachment device 210 is shown. The attachment device 210 includes a housing 212, a pin 214, and a pawl and spring mechanism 216. The housing 212 includes side portions 224 defining an aperture 226 across which the pin 214 is rotatably mounted, similar to the previous embodiments. The side portions 224 include lower surfaces 232, including recesses 234, 236, for engaging shaped frame members (not shown), as previously described. An anchoring slot 238 extends from the lower surfaces 238 for receiving a cross pin 288 of a flexible strap 282 attached to the pin 214. A flange 228 or other attachment member (not shown) extends from the housing for engaging a frame, track or leg of an accessory (not shown) being attached to the frame member.

The pin 214 includes a shaft 250 terminating in a head 252 and including a slot 254 extending axially along the shaft 250. The pin 214 may be a cotter pin with the legs of the cotter pin defining the shaft 250 and the slot 254. The head 252 may be integrally formed to the shaft 250, or alternatively, may be a separate aluminum or plastic head 252 molded to the cotter pin, as shown in FIG. 9F. The head 252 may have a hexagonal shape, or may include a recess for receiving a corresponding tool. The head 252 also includes a ratchet wheel 255 molded or formed therewith that includes a plurality of teeth 256. The shaft 250 of the pin 214 may be inserted through holes (not shown) across the aperture 226, and ends of the shaft 250 bent outward or otherwise secured to prevent the pin 214 from withdrawing.

The pawl mechanism 216 is mounted to the side portion 24 adjacent the head 252 of the pin 214. A pawl 260 extends from a base 262 of the pawl mechanism 216 and substantially engages the teeth 256 of the ratcheted wheel 255 to prevent inadvertent rotation of the pin 214. A tool, such as a socket wrench, may be directed into engagement with the head 252, and rotated with sufficient force to overcome the resistance provided by the pawl 260, and allow the flexible strap 282 to be wound and unwound from the shaft 250 of the pin 214. In a preferred form, the teeth 256 are ratcheted to allow rotation of the pin 214 in only one direction, e.g., to wind the strap 282 around the shaft 250. To allow the strap 282 to be unwound, the pawl mechanism 216 or the ratcheted wheel 255 may include a release for disengaging the pawl 260 from the teeth 256, as will be appreciated by those skilled in the art.

Figure 10A:
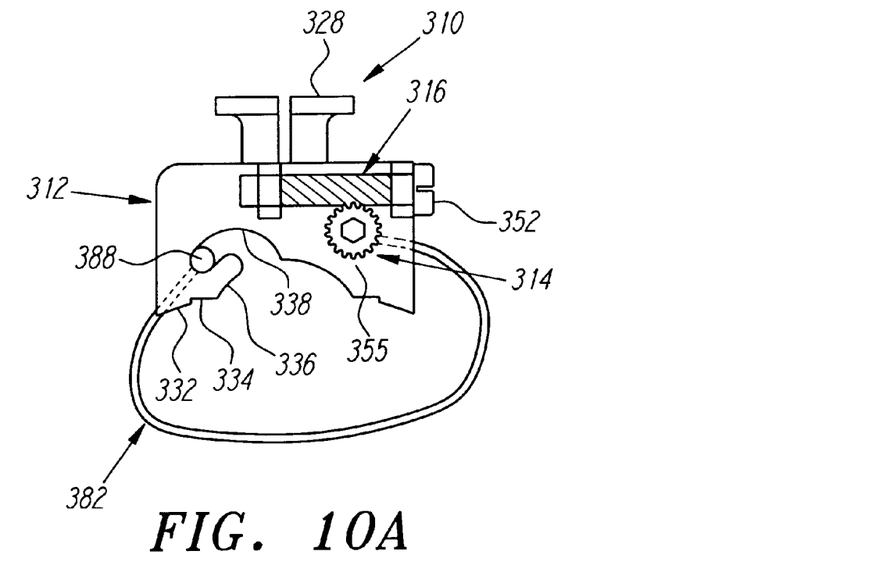
FIGS. 10A and 10B are side and end views, respectively, of still another embodiment of an adjustable attachment device.
Figure 10B:
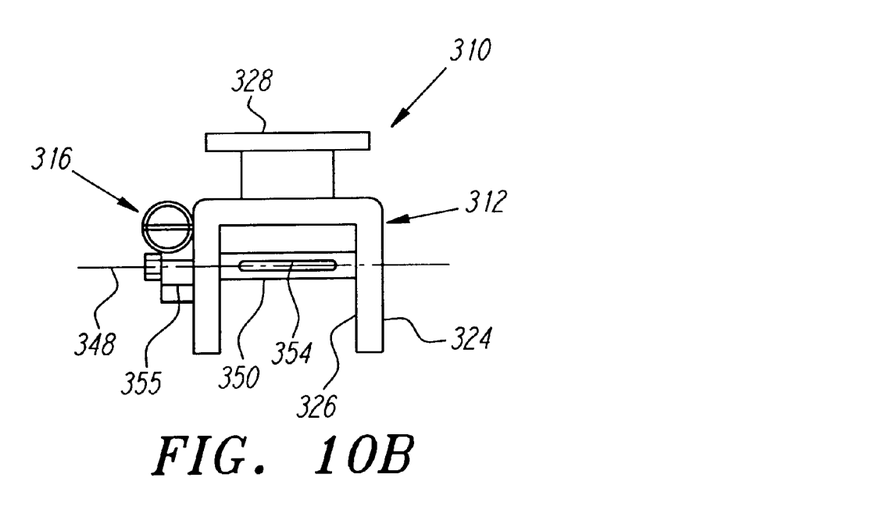

Turning to FIGS. 10A and 10B, still another embodiment of an adjustable attachment device 310 is shown. The attachment device 310 includes a housing 312 having side portions 324 defining an aperture 326, lower surfaces 332 with recesses 334, 336 and an anchoring slot 338. A pin 314 is mounted across the aperture 326, which includes a shaft 350 terminating in a worm gear 355 and including a slot 350 extending along the shaft 350.

Instead of using the pawl mechanism and ratcheted wheel described above, the attachment device 310 includes a threaded worm 316 mounted to the side portion 324 substantially perpendicular to an axis of rotation of the pin 314. The worm 316 is mounted to the housing 312 such that it directly engages the teeth 366 of the worm gear 355. A tool, such as screwdriver, may be directed into engagement with a head 352 of the worm 316, and rotated to rotate the worm 316, and consequently the shaft 350 of the pin 314 to wind and unwind a flexible strap around the shaft 350, similar to the previous embodiments.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

What is claimed is:

1. An adjustable attachment device, comprising:
   a housing having an aperture therein;
   an elongate pin rotatably mounted across the aperture, the pin having a shaft terminating in a head, the pin defining an axis of rotation for winding and unwinding a flexible strap around the shaft;
   a collar rotatably mounted to the housing coextensive with the axis of rotation defined by the pin, the collar having a head engaging portion for engaging the head of the pin to couple rotation of the pin to rotation of the collar, the collar having a ratcheted perimeter; and a locking mechanism having one or more teeth for engaging the ratcheted perimeter of the collar to prevent collar rotation;

wherein either the collar or the locking mechanism is adjustable axially between first and second positions for engaging and disengaging, respectively, the ratcheted perimeter on the collar and the teeth on the locking mechanism.

2. The adjustable attachment device of claim 1, wherein either the collar or the locking mechanism is biased towards the first position.

3. The adjustable attachment device of claim 1, wherein the pin includes an elongate slot extending along the shaft.

4. The adjustable attachment device of claim 3, further comprising the flexible strap having first and second ends, the first end being attached to the pin through the elongate slot.

5. The adjustable attachment device of claim 1, wherein the housing includes an anchoring slot for receiving a loose end of the flexible strap attached to the pin.

6. The adjustable attachment device of claim 1, wherein the housing comprises a lower surface proximate the aperture having one or more recesses therein for engaging a frame member, the one or more recesses having a shape similar to at least a portion of the frame member.

7. The adjustable attachment device of claim 6, wherein the recesses define a portion of an ellipse, a circle or a rectangle.

8. The adjustable attachment device of claim 6, further comprising the flexible strap having a first end attached to the pin, and a second end, the flexible strap having a sufficient length for allowing the flexible strap to be wrapped around the frame member engaging the recesses in the housing and the second free end to be subsequently received in an anchoring slot in the housing.

9. The adjustable attachment device of claim 1, further comprising a support flange extending from the housing for engaging an accessory being attached to the adjustable attachment device.

10. An adjustable attachment device, comprising:

a housing having an aperture therein;

an elongate pin rotatable mounted across the aperture to which a first end of a flexible strap may be attached, the pin having a shaft terminating in a head, the pin defining an axis of rotation for winding and unwinding the flexible strap around the shaft;

a collar rotatable mounted to the housing coextensive with the axis of rotation defined by the pin, the collar having a head engaging portion for engaging the head of the pin to couple rotation of the pin to collar rotation, the collar having a ratcheted perimeter; and a locking mechanism having one or more teeth for engaging the ratcheted perimeter of the collar to prevent collar rotation;

wherein either the collar or the locking mechanism is adjustable between first and second positions for engaging and disengaging, respectively, the ratcheted perimeter on the collar and the teeth on the locking mechanism;

wherein the locking mechanism comprises a capsule attachable to the housing having a cavity for receiving the collar therein, the collar being rotatable within the cavity and being axially translatable between the first and second positions within the cavity.

11. The adjustable attachment device of claim 10, wherein the capsule includes an internal perimeter having the teeth therein.

12. The adjustable attachment device of claim 10, further comprising a spring within the cavity of the capsule for biasing the collar towards the first position.

13. The adjustable attachment device of claim 10, wherein the capsule includes an opening communicating with the cavity for receiving a tool therethrough for directing the collar from the first position to the second position.

14. The adjustable attachment device of claim 13, wherein the collar includes a tool engaging portion aligned with the opening for engaging the tool received through the opening for rotating the collar with the tool.

15. The adjustable attachment device of claim 14, wherein the tool engaging portion comprises a hexagonal recess in the collar for receiving a similarly shaped working end of a tool.

16. An adjustable attachment device, comprising:

a housing having an aperture therein, and a lower surface proximate the aperture having one or more recesses therein for engaging a frame member, the one or more recesses having a shape similar to at least a portion of the frame member;

an elongate pin rotatably mounted across the aperture, the pin having a shaft terminating in a head, the pin defining an axis of rotation for winding and unwinding a flexible strap around the shaft within the aperture;

a winding mechanism attached to the housing and coupled to the head of the pin, the winding mechanism having a shaped portion for engaging a working end of a tool for rotating the pin to wind and unwind the flexible strap around the shaft; and an attachment member extending from the housing for engaging an accessory being attached to the frame member, the attachment member comprising a pair of opposing support flanges for slidably engaging a frame of the accessory.

17. The adjustable attachment device of claim 16, wherein the housing includes an anchoring slot for receiving a loose end of the flexible strap attached to the pin.

18. The adjustable attachment device of claim 14, further comprising the flexible strap having a first end attached to the pin, and a second end receivable in the anchoring slot, the flexible strap having a sufficient length for allowing the flexible strap to be wrapped around the frame member engaging the recesses in the housing and the second end to be received in the anchoring slot.

19. The adjustable attachment device of claim 18, wherein the pin includes an elongate slot extending along the shaft through which the first end of the flexible strap may be attached to the pin.

20. The adjustable attachment device of claim 16, wherein the head of the pin comprises a worm gear, and wherein the winding mechanism comprises a worm engaging the worm gear and rotatably mounted to the housing.

21. The adjustable attachment device of claim 16, wherein the winding mechanism comprises a cooperating ratchet wheel and pawl, the ratchet wheel being attached to the head of the pin and the pawl being attached to the housing.

22. The adjustable attachment device of claim 16, wherein the accessory comprises a bicycle rack, a ski rack, a cargo rack or a cargo container.

23. The adjustable attachment device of claim 16, wherein the frame member comprises a roof rack on an automobile.

24. The adjustable attachment device of claim 16, wherein the recesses define a portion of an ellipse, a circle or a rectangle.

25. The adjustable attachment device of claim 16, wherein the winding mechanism or the pin are axially translatable between first and second positions, the pin being locked from rotating in the first position, and free to rotate in the second position.

26. An adjustable attachment device, comprising:

a housing having an aperture therein, and a lower surface proximate the aperture having one or more recesses therein for engaging a frame member, the one or more recesses having a shape similar to at least a portion of the frame member;

an elongate pin rotatable mounted across the aperture to which a first end of a flexible strap may be attached, the pin having a shaft terminating in a head, the pin defining an axis of rotation for winding and unwinding the flexible strap around the shaft within the aperture; and a winding mechanism attached to the housing and coupled to the head of the pin, the winding mechanism having a shaped portion for engaging a working end of a tool for rotating the pin to wind and unwind the flexible strap around the shaft, the winding mechanism comprising:

a collar rotatably mounted to the housing coextensive with the axis of rotation defined by the pin, the collar having a portion for engaging the pin to couple rotation of the pin to rotation of the collar, the collar having a ratcheted perimeter, the collar having the shaped portion for engaging the working end of a tool; and a locking mechanism having one or more teeth for selectively engaging the ratcheted perimeter of the collar to prevent collar rotation;

wherein the collar is adjustable between first and second positions for engaging and disengaging, respectively, the ratcheted perimeter and the teeth.

27. The adjustable attachment device of claim 26, wherein the collar is biased towards the first position.

28. The adjustable attachment device of claim 26, wherein the locking mechanism comprises a capsule attachable to the housing having a cavity therein for receiving the collar, the collar being rotatable within the cavity and being axially translatable between the first and second positions within the cavity.

29. The adjustable attachment device of claim 28, wherein the capsule includes an internal perimeter having the teeth therein.

30. The adjustable attachment device of claim 28, further comprising a spring within the cavity of the capsule for biasing the collar towards the first position.

31. The adjustable attachment device of claim 28, wherein the capsule includes an opening communicating with the cavity for receiving the working end of the tool therethrough for directing the collar from the first position to the second position.

32. The adjustable attachment device of claim 31, wherein the collar includes a tool engaging portion aligned with the opening for engaging the working end of the tool received through the opening for rotating the collar with the working end of the tool.

* * * * *